(No Model.)
H. BROSSEL.
LASTING TOOL.
No. 308,053. Patented Nov. 18, 1884.
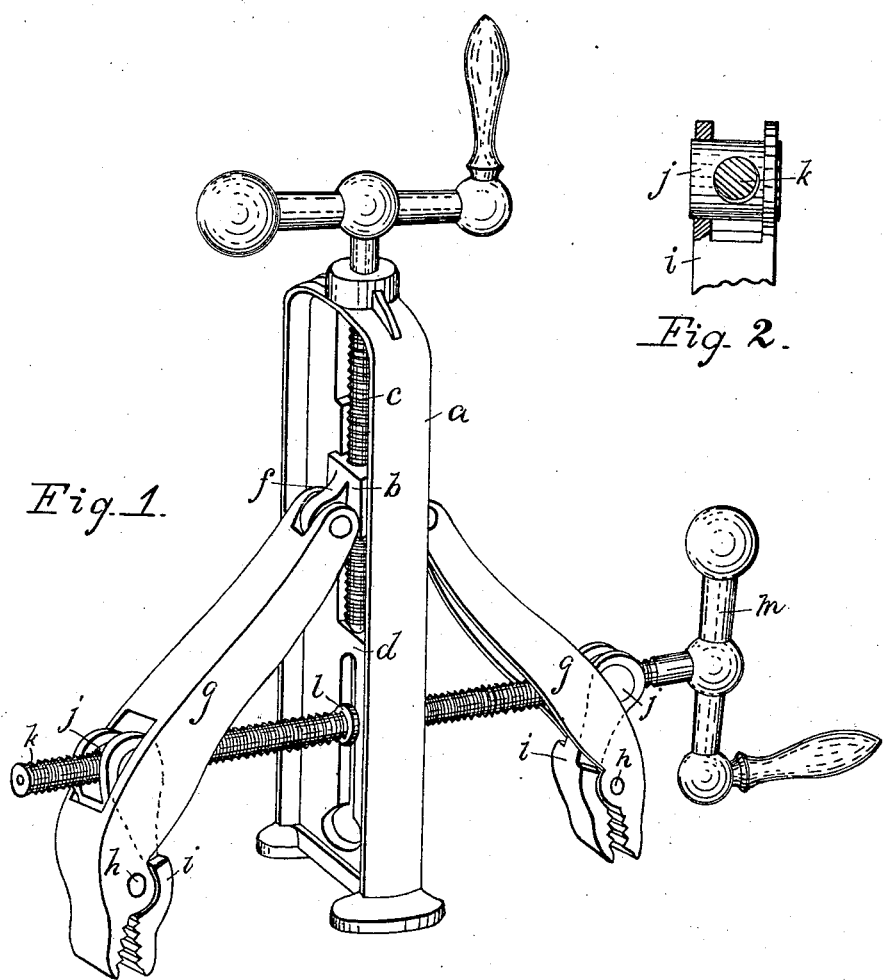
Witnesses:
Geo. K. Perrin
J. H. Hutchins
Inventor:
Hubert Brossel
By E. E. Sickler
Atty.

UNITED STATES PATENT OFFICE.

HUBERT BROSSEL, OF INDIANAPOLIS, INDIANA.

LASTING-TOOL.

SPECIFICATION forming part of Letters Patent No. 308,053, dated November 18, 1884.

Application filed March 10, 1884. (No model.)

*To all whom it may concern:*

Be it known that I, HUBERT BROSSEL, a citizen of the United States, residing at Indianapolis, in the county of Marion and State of Indiana, have invented a new and useful Lasting-Machine, of which the following is a specification.

The object of my invention is a lasting-tool which shall be at once cheap, durable, simple, and efficient in operation; and this object I attain in the mechanism shown in the accompanying drawings.

Figure 1 is a perspective view of my improved tool. Fig. 2 is a detail showing the construction of pivot $j$ and its relation to the short arm $i$.

$a$ is a frame having two vertical slots. A cross-head, $b$, moves in the upper slot, in which is threaded a screw, $c$. This screw bears loosely in the frame at its upper end, and its lower end rests upon the cross-bar $d$ of the frame, thus holding the frame firmly to the last when in operation. A ball-crank, $e$, is placed upon its upper end for rotating it. The cross-head $b$ has two ears, $ff$, upon which are pivoted the long depending jaws $g\ g$. In these jaws, at $h\ h$, are pivoted short lever-jaws $i\ i$, having blocks $j\ j$ pivoted in their upper ends, in which is threaded a screw, $k$, having both right and left thread, passing through and operating in the lower slot in the frame. A shoulder, $l$, on the screw on each side of the frame holds the screw in place longitudinally, while it permits it to move up or down in the slot. The slot is made larger at its lower end, that one of these shoulders may be passed through the frame. A ball-crank, $m$, is placed on one end of the screw for rotating the same.

The operation is as follows: The machine is placed upright upon the bottom of the boot or shoe, and the cross-head $b$ is lowered until it rests upon the cross-bar $d$ of the frame by operating the screw $c$. The long jaws $g\ g$ are now extended by the operation of the screw $k$, which moves vertically in the lower slot of the frame as the jaws move outward. By reason of the leverage the jaws open ready to receive the stock by operating the screw $k$. The stock is now placed in the jaws and the screw $k$ rotated, the right and left threads bringing the jaws together equally on each side, and by reason of the leverage in the short jaws $i\ i$ the tighter the stock is drawn around the last the tighter is it clamped in the jaws, thus preventing slippage.

The jaws may be raised into any position necessary for drawing the stock over the insole by raising cross-head $b$ with screw $c$.

I claim as my invention and desire to secure by Letters Patent—

1. The combination of the upright frame $a$, having the two vertical slots, the cross-head $b$, moving in the upper slot, the screw $c$, threaded in the cross-head, its lower end resting upon the cross-bar $d$ of the frame, its upper end moving freely in frame $a$, the jaws $g\ g$, pivoted at their upper ends to the cross-head, lever-jaws $i\ i$, pivoted in jaws $g\ g$, and right-and-left threaded screw for operating the same, substantially as shown and described.

2. Screw-shaft $c$, threaded in cross-head $b$ and moving freely in frame $a$, in combination with cross-bar $d$ and frame $a$, substantially as shown and described.

3. Screw-shaft $k$, pivot $j$, jaw $i$, pivot $h$, and jaw $g$, combined for the purpose of opening or closing the jaws upon the stock by the rotation of the screw-shaft $k$, substantially as shown and described.

HUBERT BROSSEL.

Witnesses:
E. E. SICKLER,
J. B. PUGH.